Nov. 6, 1951   R. E. KIRTLEY   2,573,716
MIXING VALVE
Filed Oct. 31, 1947   2 SHEETS—SHEET 1
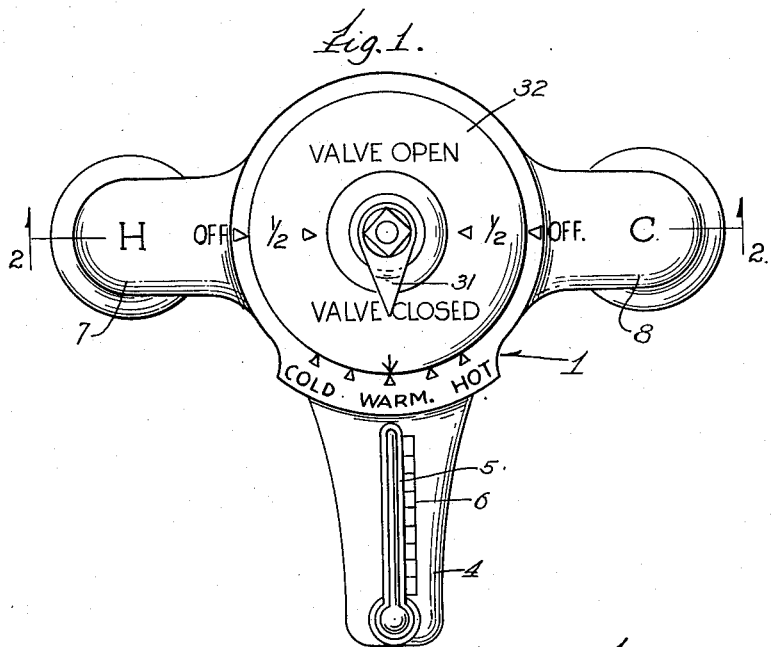
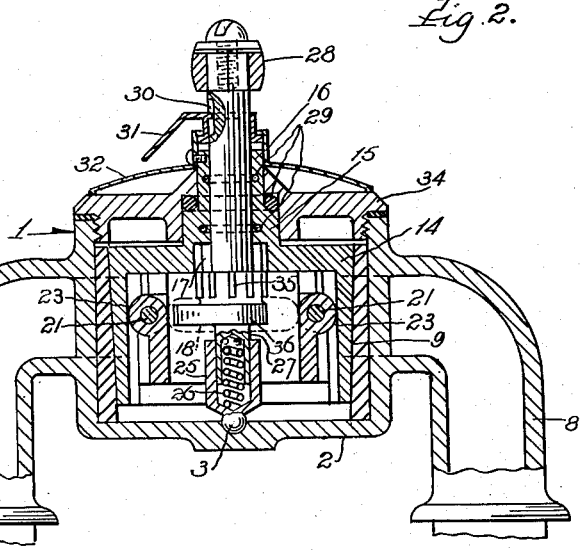
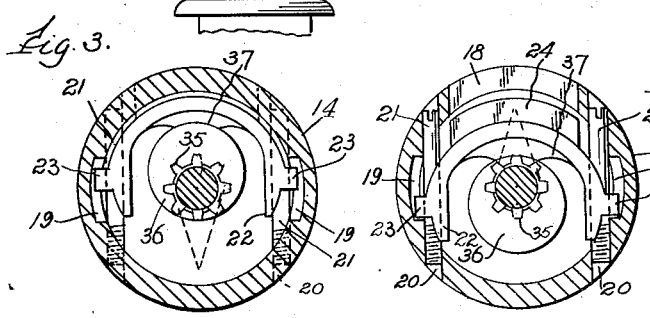
Inventor.
Robert E. Kirtley.
by H. J. Sowden
Attorney.

Nov. 6, 1951     R. E. KIRTLEY     2,573,716
MIXING VALVE
Filed Oct. 31, 1947     2 SHEETS—SHEET 2
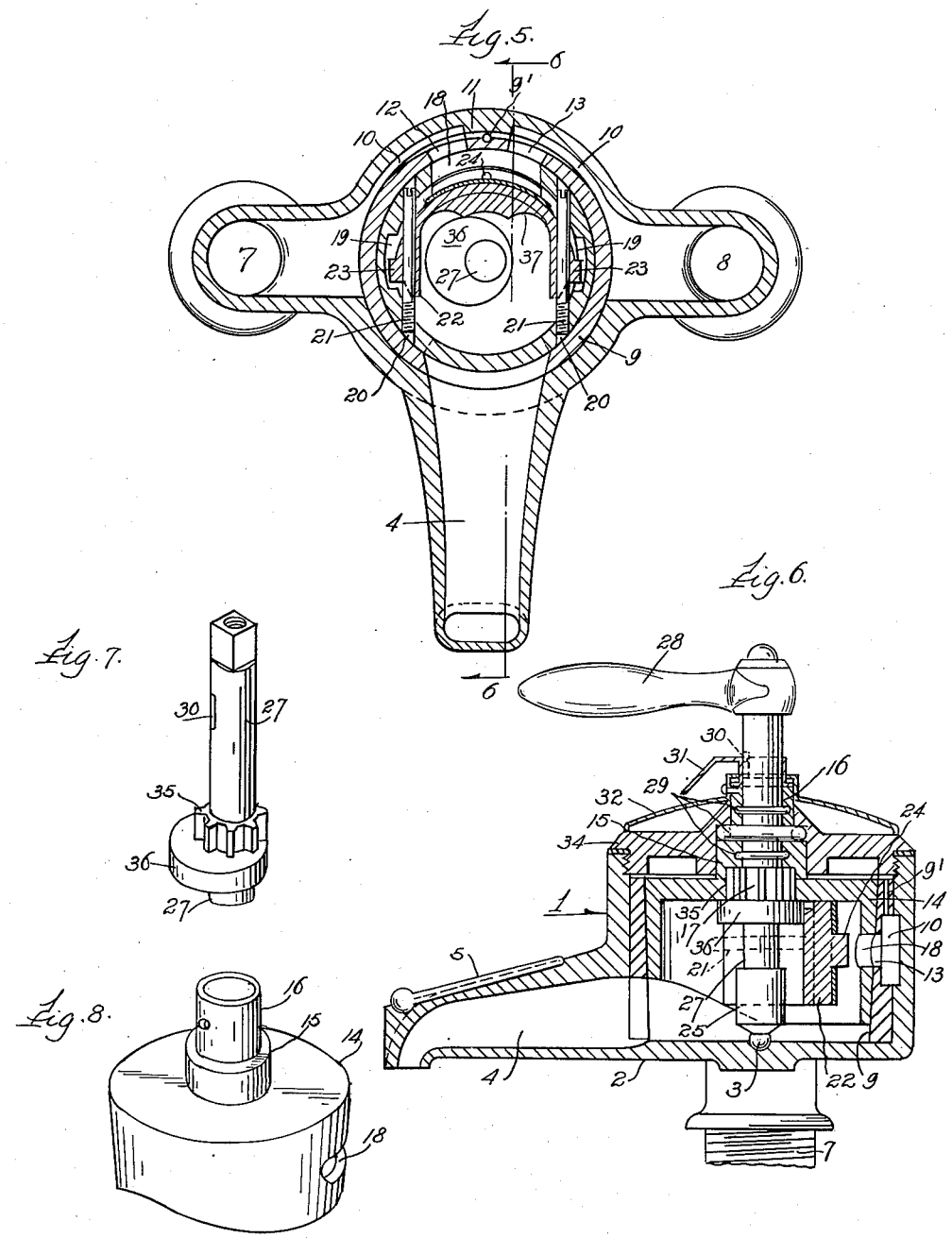
Inventor.
Robert E. Kirtley
by H. J. Sanders
Attorney Patented Nov. 6, 1951

2,573,716

UNITED STATES PATENT OFFICE 2,573,716

MIXING VALVE

Robert E. Kirtley, Chicago, Ill.

Application October 31, 1947, Serial No. 783,377

3 Claims. (Cl. 277—8)

This invention relates to mixing valves or faucets, and more particularly to a fixture for mixing hot and cold water or other liquids for use in bath tubs, wash bowls, sinks and the like. One object is to provide a fixture of this type for supplying hot and/or cold water in any proportion or at any temperature desired. A further object is to provide means for readily varying the proportion of hot water to cold, or vice versa instantly.

A still further object is to provide means for supplying a liquid mixture at a desired temperature, cutting off the supply temporarily and again turning on same without variation of temperature, all through the medium of one handle or control. A further object is to provide a liquid mixing valve that is positive and efficient in operation, of few parts, of durable construction and not likely to get out of order and that is therefore inexpensive to manufacture and attractive in appearance.

Other objects, novel features and advantages of arrangement, construction and design comprehended by the invention are hereinafter more fully pointed out or made apparent from the following description of a preferred embodiment as illustrated in the accompanying drawings wherein like reference characters denote corresponding parts throughout.

In the drawings:

Fig. 1 is a top plan view of a mixing valve in accordance with the instant invention, with the valves in indicated closed position.

Fig. 2 is a transverse vertical sectional view through Fig. 1 on the line 2—2.

Figs. 3 and 4 are horizontal sectional views through the mixing chamber with the adjustable parts in altered positions.

Fig. 5 is a horizontal sectional view through Fig. 1.

Fig. 6 is a central vertical sectional view through Fig. 1 taken at right angles to Fig. 2 on the line 6—6 of Fig. 5.

Fig. 7 is a perspective view of a valve stem and connections, and, Fig. 8 is a fragmentary view of a rotary valve employed.

The reference numeral 1 denotes a casing or mixing chamber having a substantially round body portion having a base 2, the inner face of which is formed with a central recess 3, the casing provided with a delivery 4 for tub or the like, said delivery formed with a longitudinal recess forming a bed for the thermometer 5 and with a thermometer scale 6. The casing 1 is formed or provided with a pair of lateral oppositely disposed separated hot and cold water inlets 7, 8 connected with conventional hot and cold water supply pipes. Received in the casing or chamber 1 and pressed or otherwise securely fixed in engaging relation therewith is the bushing 9 rising from the casing base to a point spaced inwardly a slight distance from the casing upper end, the bushing being cut away about the inner termination of the delivery 4 complementary thereto, the upper end of the casing above the bushing being threaded about its inner face, the inner face of the casing at the rear being formed with recesses or channels 10, 10 communicating with the hot and cold water inlets 7, 8 forming water passageways, said recesses being separated by a casing boss 11 disposed in line and/or slightly above the water passageway of the delivery 4. It will be noted that the thickness of the wall of the bushing 9 is relatively small at the upper end thereof and gradually increases as it approaches the lower end for a purpose to be hereinafter set forth, the bushing being formed further with spaced perforations 12, 13 in registry respectively with the recesses 10, 10 of the casing and with a bleed port 9' opening into the cold water passageway.

Received in the bushing 9 and separated from the casing thereby is the rotary inverted cup-shaped valve 14 the lower termination thereof spaced slightly above the base of the casing, the wall of the valve cut away about the cut away portion of the bushing about the inner termination of delivery 4 so that a liquid passageway is provided between the interior of valve 14 and the delivery, the upper end of the body portion of the valve being flush with the upper bushing termination, the wall of the valve tapering slightly from its upper to its lower end so that a wedge-like fit between valve and bushing is provided, as clearly shown in Figs. 2 and 6.

The upper or inverted base portion of the valve is formed with an upwardly disposed contracted stepped extension or stem 15 rising above the upper termination of the casing 1, disposed centrally thereof, the upper termination 16 thereof being of relatively small diameter, the lower portion having its bore widened at its juncture with the valve proper to accommodate teeth 17 formed in the inverted valve base and extending slightly into the extension. The valve 14 is formed with a horizontal elongated slot 18 spaced from and parallel to the inverted base, the slot 18 having a length substantially equal to the combined extent of the spaced perforations 12, 13 including the spacer therebetween as clearly shown in Fig. 5 and in the open position of the valve there shown being aligned with said perforations.

The valve 14 upon its inner face in the plane of the slot 18 is formed with oppositely disposed arcuate recesses 19, 19 spaced about 90 degrees from the center of said slot and adjacent said recesses with screw threaded pin slots 20, four in number, the slots in one side of the valve being in line with each other and upon opposite sides of a recess 19 and defining the ends of an arc passing through that recess, the slots upon each side of the valve receiving a threaded pin 21 passing freely through oppositely disposed perforate portions of a substantially semi-cylindrical slide valve 22 having ears 23, 23, two in number disposed in said recesses 19, 19 limiting movement in either direction of said slide valve.

The slide valve is of a depth slightly less than that of valve 14 and in line with slot 18 of valve 14 is provided with an arcuate lip 24 of substantially the same extent as said slot and as said slide valve is moved back and forth, as hereinafter described, extends into and out of said slot and into and out of contiguity with bushing perforations 12, 13 closing and opening same, or as said valve 14 is rotated partially closing or opening one or the other of said perforations, and thereafter completely closing or opening same, depending upon the direction of movement of said valve.

Received in the recess 3 in the casing base is the ball-shaped termination of the cup 25 provided with an expansion coil spring 26 the upper end of which is received in the hollow end of the rotary axially adjustable spindle 27 provided at its upper end with the conventional handle 28, said faucet spindle extending from the cup 25 up through the valve 14 and extension 15, 16 and yieldingly retained against manual movement axially by the rubber or like resilient rings 29 encircling same and seated in annular recesses or upon an annular shoulder in the stem, said spindle being splined at 30 to an indicator 31 secured to cap 32 and extension 16, said cap provided with indicia readable in connection with the indicator, said cap being disposed atop the cover 34 in screw threaded engagement with the upper threaded inner face of the casing or mixing chamber. Fast upon the spindle is the toothed collar 35 at such position that with the spindle in raised normal position it is in mesh with the teeth 17 of valve 14 as shown in Fig. 6 and in the lower position of the spindle said collar is disengaged from the teeth as shown in Fig. 2.

Fast upon spindle 27 contiguous to the lower face of the collar 35 is a cam 36 that peripherally engages the inner multiple-recessed face of the insert 37 secured to the inner face of said slide valve.

In operation, with the spindle in raised normal position and the handle 28 above and in line with the delivery, water coming under main pressure through the inlets 7, 8 passes through the passageways 10, 10, through the bushing perforations 12, 13, through the then aligned slot 18 in the valve 14 and out through the delivery 4. This water is a substantially equal mixture of hot and cold, or warm water, as will be denoted by the indicator in the position shown in Fig. 1. When the handle is moved to the right the indicator moves toward the designation "hot" on the cap 32 and the teeth of collar 35 rotate the valve 14 in a direction to cause slot 18 to move out of registry with the perforation 13 in the bushing cutting off the supply of cold water completely by the time the handle moves slightly less than ⅛ full turn. By the time the handle is moved a full quarter turn to the right the slot 18 is out of registry with both perforations 12 and 13 and the water is completely shut off. Before a complete ⅛ turn of the handle from its position in line with the delivery is made the cold water is diminished in ratio to the hot until the cold is completely shut off. A movement of the handle from its full open position to the left will first diminish and then shut off water completely. Obviously it is possible therefore to admit any hot and cold mixture desired and thereafter the handle may be manually depressed to disengage the collar 35 from the teeth 17 of valve 14 and the slot 18 closed by then moving the handle and indicator to cause the cam 36 to move the slide valve 22 into said slot. The handle is now released and since the rotary valve 14 remained stationary as soon as the collar 35 moved out of engagement with the teeth 17 the ratio of hot to cold water remains undisturbed until the collar and teeth are again enmeshed. When the handle 28 is released the spring 26 will at once raise the spindle to normal position.

When it is again desired to turn on the water with the mixture ratio undisturbed the handle is again depressed to again disengage the collar and teeth 35, 17 thus again opening slot 18 so that when the handle is again manually released it again assumes normal raised position and the water flow is resumed. The water pressure from a city main will cause the bleed port 9' to keep the fixtures supplied with water above the inverted base of the rotary valve in the hollow portions of the cover 34, this pressure exerted against the valve will keep same in positive engagement with the bushing and prevent water leakage or dripping. The temperature of the water passing through the delivery 4 is revealed by the thermometer 5.

What is claimed is:

1. In a mixing fixture, a mixing chamber having a pair of inlets and a delivery, a pair of separated passageways in said mixing chamber registering with said inlets, a bushing in said mixing chamber having spaced perforations registering with said mixing chamber passageways, a rotary valve in said bushing having a slot for selective registration and non-registration with said bushing perforations singly and jointly, an axially adjustable spindle in said rotary valve, a slide valve associated with said rotary valve for opening and closing said rotary valve slot, and means releasably connecting said spindle to said rotary valve and to said slide valve for actuating same, said means effective only when said spindle is disengaged from said rotary valve.

2. In a mixing fixture, a mixing chamber having a pair of inlets and a delivery, a pair of separated passageways in said mixing chamber registering with said inlets, a bushing in said mixing chamber having spaced perforations registering with said mixing chamber passageways, a rotary perforate valve in said bushing having a slot for selective registration and non-registration with said bushing perforations singly or jointly, said valve formed with wall recesses spaced equidistant from and in the plane of said slot, pins in said valve perforations contiguous to said recesses, a slide valve in said rotary valve supported by said pins for opening and closing said rotary valve slot, a spindle adjustably supported in said rotary valve, means connecting said spindle and mixing chamber for yieldingly retaining said spindle in a predetermined position, releasable connection between said spindle and rotary valve operative in one position of said spindle, connection between said spindle and slide valve for actuating the latter, said means effective in a second position of said spindle, and a handle for said spindle.

3. In a mixing fixture, a mixing chamber having a pair of inlets and a delivery, a pair of separated passageways in said mixing chamber having spaced perforations registering with said mixing chamber passageways, a bushing in said mixing chamber having spaced perforations registering with said mixing chamber passageways, a rotary valve in said bushing having a slot for selective registration and non-regstration with said bushing perforations singly and jointly, teeth in said rotary valve, a slide valve operatively associated with said rotary valve to open and close the slot therein, an axially adjustable spindle in said rotary valve, a handle for said valve, a toothed collar fast upon said spindle in mesh with said valve teeth in one position of said spindle, actuating means for said slide valve connecting same and said spindle operative in a second position of said spindle, and means connecting said mixing chamber and spindle for yieldingly retainng the latter in a predetermined position.

ROBERT E. KIRTLEY.

REFERENCES CITED

The following references are of record in the file of this patent:

UNITED STATES PATENTS

| Number | Name | Date |
| --- | --- | --- |
| 628,783 | Fisher | July 11, 1899 |
| 772,953 | Morrison | Oct. 25, 1904 |
| 998,496 | Godleskie | July 8, 1911 |
| 1,664,901 | Rosenbaum | Apr. 3, 1928 |
| 1,773,719 | Bentley | Aug. 26, 1930 |
| 1,797,445 | Rundqvist | Mar. 24, 1931 |
| 2,090,581 | Martin | Aug. 17, 1937 |
| 2,214,619 | Krieger | Sept. 10, 1940 |